(12) United States Patent  (10) Patent No.: US 12,110,001 B1
Gudmundsson et al.  (45) Date of Patent: Oct. 8, 2024

(54) VEHICLE OPERATING SYSTEM

(71) Applicant: KARMA AUTOMOTIVE LLC, Irvine, CA (US)

(72) Inventors: Stefan Gudmundsson, Irvine, CA (US); Kevin Y. Zhang, Irvine, CA (US); Lance Zhou, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 415 days.

(21) Appl. No.: 17/523,804

(22) Filed: Nov. 10, 2021

Related U.S. Application Data

(60) Provisional application No. 63/112,072, filed on Nov. 10, 2020.

(51) Int. Cl.
*B60W 20/12* (2016.01)
*B60L 15/20* (2006.01)
*B60L 50/60* (2019.01)
*B60R 16/023* (2006.01)
*B60W 10/06* (2006.01)
*B60W 10/18* (2012.01)
*B60W 10/22* (2006.01)
*B60W 30/18* (2012.01)
*G01C 21/34* (2006.01)

(52) U.S. Cl.
CPC ......... *B60W 20/12* (2016.01); *B60L 15/2045* (2013.01); *B60L 50/60* (2019.02); *B60R 16/0231* (2013.01); *B60W 10/06* (2013.01); *B60W 10/18* (2013.01); *B60W 10/22* (2013.01); *B60W 30/18127* (2013.01); *G01C 21/3469* (2013.01); *G01C 21/3476* (2013.01); *B60L 2240/62* (2013.01); *B60W 2710/0611* (2013.01); *B60W 2710/18* (2013.01); *B60W 2710/223* (2013.01)

(58) Field of Classification Search
CPC ...... B60W 20/12; B60W 10/06; B60W 10/18; B60W 10/22; B60W 30/18127; B60W 2710/0611; B60W 2710/18; B60W 2710/223; B60L 15/2045; B60L 50/60; B60L 2240/62; B60R 16/0231; G01C 21/3469; G01C 21/3476
See application file for complete search history.

(56) References Cited

U.S. PATENT DOCUMENTS

| | | | | |
|---|---|---|---|---|
| 2012/0158229 | A1* | 6/2012 | Schaefer | G01C 21/3469 320/109 |
| 2013/0079962 | A1* | 3/2013 | Ishikawa | B60L 15/2045 701/22 |
| 2015/0057906 | A1* | 2/2015 | Nefedov | B60W 50/0097 701/1 |
| 2016/0139594 | A1* | 5/2016 | Okumura | B60W 30/00 701/2 |
| 2017/0203756 | A1* | 7/2017 | Cotgrove | B60W 10/18 |
| 2020/0216066 | A1* | 7/2020 | Aggoune | B60W 40/02 |
| 2021/0245766 | A1* | 8/2021 | Sato | B62D 15/025 |
| 2022/0383432 | A1* | 12/2022 | Sakata | B60L 53/305 |

* cited by examiner

Primary Examiner — Jelani A Smith
Assistant Examiner — Alyssa Rorie
(74) Attorney, Agent, or Firm — Honigman LLP; Grant Griffith; Thomas Appledorn

(57) ABSTRACT

A vehicle system is provided that optimizes vehicle operation by utilizing artificial intelligence and machine learning and providing dynamic changes to the vehicle characteristics. The vehicle system includes one or more sub-systems controlled by a vehicle operating system utilizing artificial intelligence and machine learning.

20 Claims, 2 Drawing Sheets

VEHICLE OPERATING SYSTEM

CROSS REFERENCE TO RELATED APPLICATION

This application claims priority to and the benefit of U.S. Provisional Patent Application No. 63/112,072, filed on Nov. 10, 2020. The foregoing provisional application is incorporated by reference herein in its entirety.

GENERAL DESCRIPTION

The present disclosure relates to a system for optimizing operation of a vehicle. Specifically, a system utilizing AI in order to provide extended range and performance for an electric vehicle (EV).

As usage of EVs increase around the world, range anxiety becomes a prominent issue for EV users. Range anxiety is the fear that a vehicle has insufficient range to reach its destination and, as a result, the vehicle's occupants could become stranded. Range anxiety may reduce the demand for EV and constrain expansion of the EV market while, at the same time, the charging infrastructure continues to be aggressively developed. In order to provide improved ranges electric vehicles, there is a need to improve the operation of the powertrain system via different monitoring systems and algorithms through machine learning or artificial intelligence (AI). The improved operation system and the associated algorithms may also lead to improved experience for the occupants of the vehicle and a reduced cost of ownership of the vehicle.

BRIEF DESCRIPTION OF THE DRAWINGS

The features, aspects, and advantages of the disclosed deliver system will become apparent from the following description, and the accompanying exemplary embodiments shown in the drawings, which are briefly described below.

DETAILED DESCRIPTION

The disclosed embodiments provides a vehicle system comprising a vehicle including at least one vehicle sub-system, wherein the at least one vehicle sub-system includes a powertrain system, said power train system includes a main propulsive battery and at least one propulsive motor, wherein said main propulsive battery is configured to power the at least one propulsive motor to rotate a wheel of the vehicle. At least one controller configured to control the at least one vehicle sub-system. A vehicle network located external of the vehicle, said vehicle network system configured to communicate with the vehicle. A user device configured to communicate with the vehicle network system and the vehicle. wherein the vehicle network is configured to receive network input signals from at least one of the vehicle and the user device, wherein the vehicle network is configured to send network output signals to the vehicle to modify at least one parameter of the at least one vehicle sub-system, wherein the network output signals are based on the received network input signals sent from the vehicle and/or the user device.

Another disclosed embodiment includes A method of operating a vehicle, said method comprising the steps of controlling the vehicle via at least one vehicle sub-system, wherein said vehicle sub-system includes powertrain system, said power train system includes a main propulsive battery powering at least one propulsive motor to rotate a wheel of the vehicle, controlling at least one vehicle sub-system via at least one controller, communicating with the vehicle via a vehicle network located external of the vehicle, communicating with the vehicle network system and the vehicle via a user device. The vehicle network receiving network input signals from at least one of the vehicle and the user device. The vehicle network sending network output signals to the vehicle to modify a parameter of the at least one vehicle sub-system, wherein the network output signals are based on the received network input signals sent from the vehicle and/or the user device.

Figure 1:
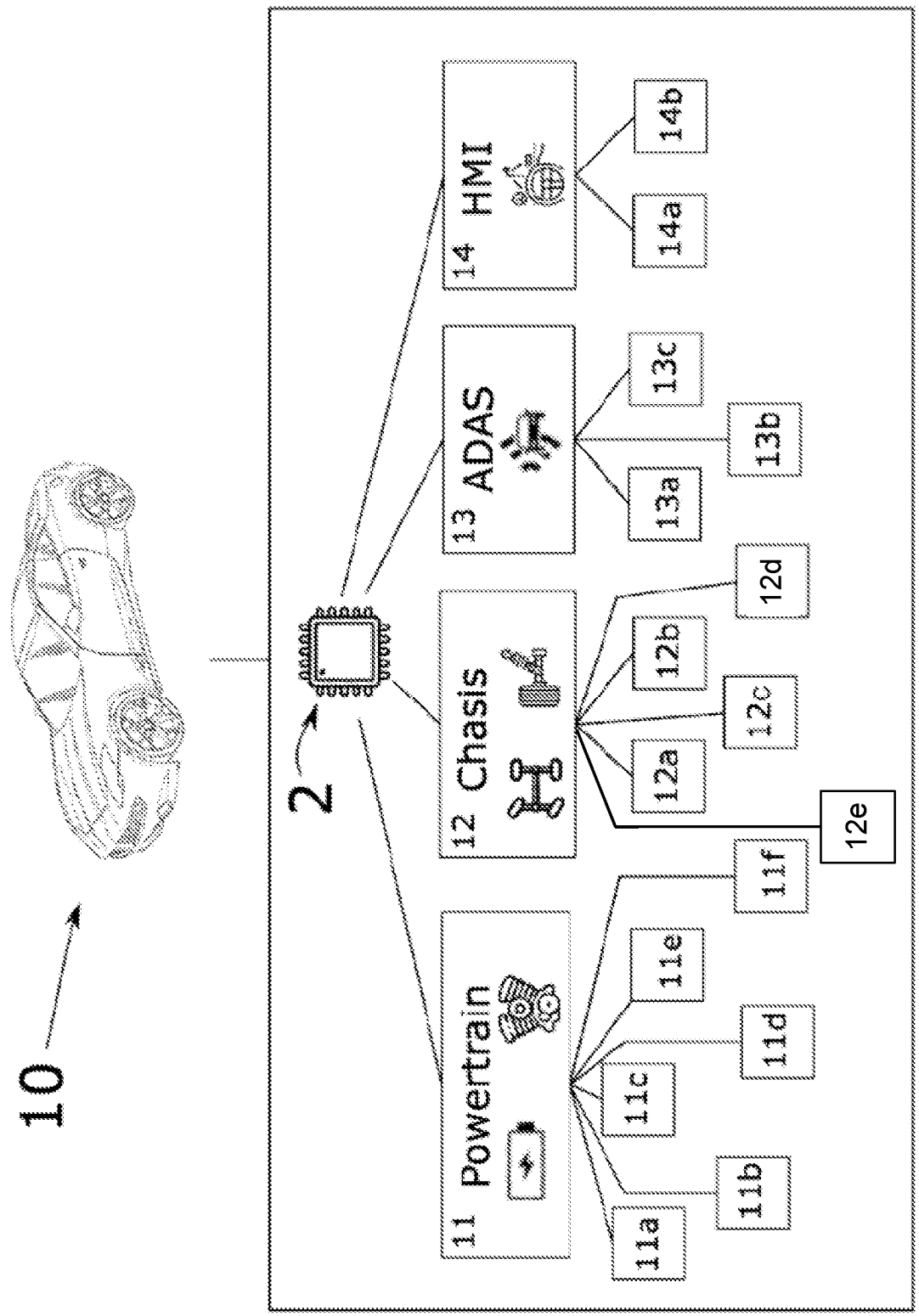
FIG. 1 is a block diagram of a vehicle including various vehicle components having an exemplary system architecture.

FIG. 1 illustrates an exemplary electric vehicle 10. The vehicle 10 may be connected to user devices 20 and includes a vehicle network that is part of a vehicle operating system 30. The vehicle may be a completely electric vehicle or a hybrid electric vehicle such as a hybrid vehicle. As a hybrid vehicle, the vehicle may include a high voltage battery powering one or more propulsive motors and a generator powered by an internal combustion engine. The battery and the generator are configured to provide power in series or in parallel. A pure electrical vehicle is configured to include a HV battery to drive one or more propulsion motors. The vehicle 10 may include one or more controllers 2 configured to control multiple systems such as a power train system 11 which may be a hybrid power train system (e.g., having a propulsive HV battery system 11a and generator 11b) or a pure electric battery power train system (e.g., no generator 11b). The vehicle 10 may further include vehicle chassis system 12, autonomous driver assistance systems (ADAS) 13, and a human-machine interface system (HMI) 14. The generator may be powered by any of a number of known combustion type engines such as hydrogen, gasoline, diesel fuel, syngas, renewable natural gas (RNG) engines. Generator system 11b may be any combination of power sources, for example fuel cells, solar panels or any power producing mechanism known to one of ordinary skill in the art.

The battery system 11a may include a battery management system (BMS) and a plurality of battery cells and modules. The BMS system may include a controller and software for controlling the operation of the battery cooling system and the battery bus voltage, for example. The system 11a may be configured to power one or more electrical propulsion motors 11c that drive one or more wheels of the vehicle 10. The generator system 11b may be omitted for a fully electric vehicle. The powertrain system 11 may also include sensors such as an internal combustion engine system sensor 11d (e.g. temperature sensor, oxygen sensor, etc.) configured to monitor the generator 11b, a state-of-charge sensor 11d and battery temperature sensor 11e for an HV battery of the battery system 11a. Other known sensors may be utilized in the vehicle 10 may be utilized in vehicle 10 for the invention described herein.

The vehicle chassis system 12 may include sub-systems such as a vehicle suspension system 12a and vehicle drive-train torque management system 12b. The chassis system 12 allows the vehicle to dynamically change handling characteristics and ride quality.

ADAS 13 may include sensors such as LIDAR 13a, RADAR 13b, and optical sensors 13c that can be used by a controller to autonomously control the vehicle. The ADAS 13 system allows the vehicle to drive autonomously with no to minimal input from the driver.

Vehicle engine sensors 12e, vehicle pedal sensors 12c (brake and throttle), and vehicle dynamics sensors 12d (e.g., accelerometers to sense acceleration in multiple directions). A Fuel meter may be provided (not shown) and is configured to measure amount of liquid fossil fuel in the vehicle for hybrid vehicles.

Each of the sub-systems may separately include one or more optional controllers for controlling the operation of each of the subsystems. Thus, the overall operation of the vehicle 10 may be controlled by the controller 2 and one or more additional controllers associated with each of the various sub-systems employed in the vehicle. The vehicle may also include one or more communication busses to handle the flow of data between the various systems and controllers.

Figure 2:
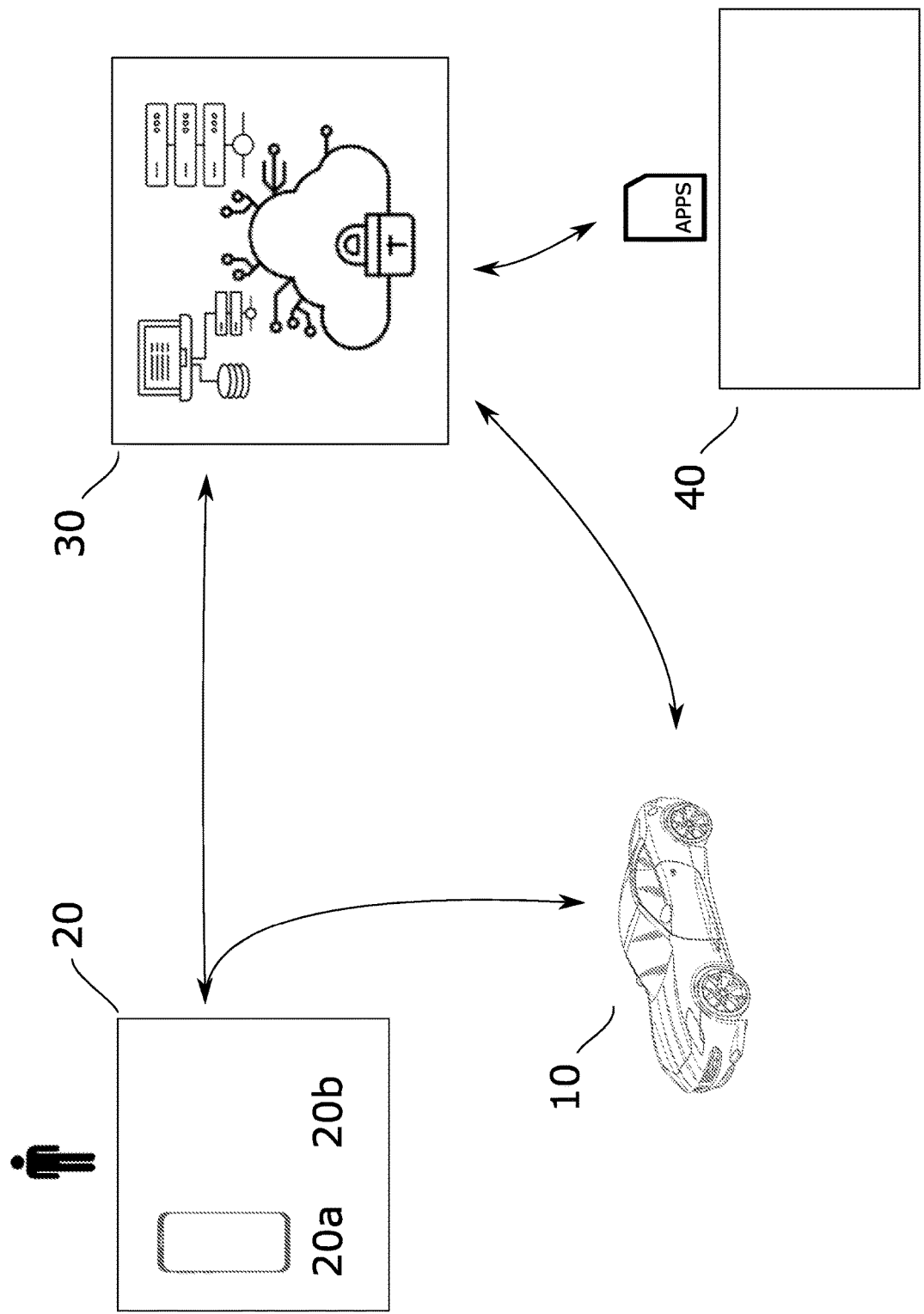
FIG. 2 is a block diagram showing a vehicle operating system for the vehicle of FIG. 1.

As shown in FIG. 2, the vehicle 10 may be controlled based on input from a vehicle operating system 30 and/or user devices 20. The user devices 20 receive input from corresponding users of the devices. User devices 20 include any personal devices that are connected to the internet such as a smartphone 20a and a personal computer 20b. The internet connection allows the vehicle operating system 30 to communicate with the user devices 20. Each device of user device 20 may include user data which can be utilized by the vehicle operating system 30 to predict user intent and habits. For example, the vehicle operating system 30 may take data from the user's calendar or previous location history in order to predict when and/or where a corresponding user of the user devices 20 will travel. The operating system 30 may dictate routes and time of departure to the vehicle 10 (or recommend routes to the driver) depending on predicted user intent determined based on input from the user device 20.

User intent may be predicted via the user's or passenger's calendar data in the user devices 20. The user device 20 and vehicle 10 may also collect location data and utilize the location data to establish habits data (e.g., work commute, Sunday morning trip to coffee shop, etc.). These habits and calendar data are the basis for user intent. The system 30 may take predictions using the habits and calendar data and calculate the route info (e.g., time, distance, energy use) and correlate the route information to the remaining battery charge (i.e. remaining range) of the vehicle 10. If there is not enough remaining range or total range, the operating system 30 may provide directions to the driver to use generator (e.g., generator system 11b) to supplement or suggest charging at destination or need for charging stops en-route. The operating system 30 may even locate and reserve charging stations and decide the minimum charge needed to complete the trip (e.g., top off charge to make it home for overnight charge). The system may also provide directions to alternate the power sources that are available to be utilized by the vehicle in order to ensure that a trip can be completed. The system may also notify the operator with recommendations and/or alerts regarding a type of operation that supports the trip objective. These notifications may include re-charging and/or re-fueling suggestions regarding timing and location.

The vehicle operating system 30 may also interact with various application systems 40 (e.g. phone applications software, computer software, etc.). The application systems 40 may include map applications such as Google Maps™, weather applications, traffic data applications, electric vehicle charging applications, or with any other applications or software and their corresponding servers or database via API and/or other known methods of connecting through wired, wireless or wave guide manner. Vehicle operating system 30 is configured to receive input from the vehicle 10 and vehicle sensors, the user devices 20, and various applications 40 in order to provide an output to control the vehicle 10. Inputs from vehicle 10 include data from the HV battery state of charge sensor 11d, battery temperature 11e, generator temperature 11f, and other vehicle data such as vehicle telemetry from powertrain system 11, chassis system 12, and ADAS 11 and may include any sensor or data from the vehicle's power train system 11, chassis system 12, ADAS 13, and HMI 14. Specific data may include, for example, HV battery state-of-charge, engine temperature, power electronics temperature, vehicle operating condition. The output of the vehicle operating system 30 to the vehicle 10 may include commands to the vehicle in order to optimize vehicle range, vehicle comfort and/or performance, and vehicle operation costs and efficiency. Application 40 may also be directly connected and configured to communicate to user devices 20 and the vehicle 10 directly without being processed or transmitted through the vehicle operating system 30.

Vehicle operating system 30 may utilize cloud systems such as cloud computing systems and cloud database systems. The vehicle operating system 30 optimizes the operation of the vehicle 10 by utilizing an artificial intelligence system. The artificial intelligence system may include machine learning systems or neural networks, where a model is trained to fuse the input data for a best solution based on objective (e.g., time efficiency, energy savings, range maximization, driving style optimization, performance/racing driving). The models will evolve as the artificial intelligence system learns what has impact or what can be ignored in calculations for objective. Output data from the operating system 30 may be received by the vehicle controller 2. The vehicle controller 2 may then take the data sent from the network 30 and process the data to provide commands to corresponding systems of vehicle 10 such as the power train system 11, chassis system 12, ADAS 13, and HMI 14. For example, the power train system 11 may receive input from the vehicle operating system via controller 2 to precisely maintain the HV bus voltage to an optimized value based on route information of the drive. The vehicle operating system 30 provides efficient operation of the vehicle 10 via controller 2 by providing dynamic operation of the power train system 11. Power train system 11 and vehicle chassis system 12 may also receive input from the operating system 30 via controller 2 in order to modify the vehicle such as suspension (e.g., modifying stiffness), braking (e.g., selectively turning regenerative braking on or off), generator utilization (e.g., using the generator in a charging mode or a power boost mode), optimization of torque vectoring, and throttle/brake response (e.g. sensitivity).

The operating system may selectively turn on/off portions of the battery system 11a or generator system 11b in order to provide optimal vehicle performance, range, and life. Further examples of computations and outputs from the vehicle operating system 30 includes: calculating the total energy consumption for the trip, predicting total energy recovered via brake energy recovery systems, determine energy generated by the generator for a series hybrid power train, determine present and total energy draw from the propulsive HV battery, controlling the power train to reach a noise, vibration, and harshness (NVH) levels, smart generator start stop based on operating conditions, optimal generator performance based on vehicle and route parameters, and optimizing the battery system of the powertrain system. The vehicle operating system may utilize any of the data calculated above and provide optimal vehicle commands to the vehicle 10 via the controller 2.

Utilizing all the receiving inputs, the system 30 may control the vehicle to certain locations that include battery charging facilities depending on the travel conditions such as traffic and thus increasing the effective range of the vehicle 10. Other methods to increase the range of the vehicle include changing the drivetrain performance such that range is optimized. For example, during slow traffic the vehicle may optimize range by utilizing the minimum amount of electric motors to drive the vehicle and provide a softer driving performance for the vehicle (e.g., less/softer throttle response, enabling regenerative braking) for both manual driving, adaptive cruise control (ACC), and self-driving modes, thus allowing for minimal power draw from the battery to the propulsion motors. The vehicle operating system 30 may also provide optimal throttle mapping, engine mapping, or motor torque mapping to suite the route depending on the route's elevation, road conditions, or traffic. For example, in low traction conditions, the output torque of the vehicle may be lowered to reduce traction loss. Various different driving and route conditions may modify the vehicle characteristics in order to provide an optimized vehicle. In another example, ADAS 13 may be configured such that autonomous driving is optimized by utilizing both sensor data from sensors 13a-13c and input from vehicle operating system 30 processed by controller 2. The combination of the power train system 11, chassis system 12, ADAS 13, HMI 14, controller 2 and the vehicle operating system 30 provides maximum range for the vehicle.

The vehicle operating system 30 may also dynamically configure the recommended route for the vehicle by utilizing the applications 40. The operating system 30 may receive usage data from electric charging stations and is configured to change the route depending on the vacancy or occupancy load of the stations. Both the vehicle operating system 30 and user devices 20 interface to work together to provide the vehicle 10 with the appropriate operating commands. The vehicle connection to the vehicle operating system 30 may not be available at all times. In this case, user devices 20 may act as a local optimization system by using stored data saved in the user devices 20. The vehicle operating system 30 may retrieve charging availability, route time/ETA, route elevation or elevation changes, traffic, and road conditions from applications 40.

The HMI 14 may receive data from the vehicle operating system 30 via controller 2 and display the data received to the driver. Optimal routes to the destination calculated by the operating system 30 may be displayed onto the HMI system 14 (e.g. vehicle dash 14a or center console display 14b). The optimal route may navigate the driver of the vehicle to nearest charging points within the route. The vehicle operating system 30 may calculate optimal battery charging location during a route based on factors such as charging station availability and rates. For example, when rates are above a certain threshold the operating system may not recommend any charging to the vehicle. The vehicle operating system 30 may also be configured to optimize battery life by limiting charging rate and battery charge. For example, for a given route or trip the operating system may set a predetermined state of charge for the battery such that the battery will not require a full 100% charge. The operating system may connect to various different charging systems (e.g. EVgo, Electrify America, Chargepoint, Tesla, etc.). The operating system 30 may also provide vehicle operation recommendations to the driver through the HMI system 14. For example, the operating system 30 may note that the user is providing too much throttle during vehicle acceleration. The operating system 30 may provide a display to the user via HMI 14 in order to display a notice regarding throttle operation. As an alternative, the operating system 30 may provide instructions to the power train system 11 via controller 2 to provide a different throttle map in order to optimize vehicle operation. HMI 14 may also receive input from the driver/passengers to provide to the operating system 30 or applications 40. Applications 40, alone or in conjunction with operating system 30, may be configured to calculate the desired route depending on the input from the driver/passenger. By setting objective parameters (e.g., cheapest trip, shortest distance, shortest time, trip in EV mode only, sporty weekend drive), an optimum solution can be based on the user's selected criteria or user intent. The optimum solution based on user intent can include routing based on map information and live data during vehicle operation.

The operating system 30 may minimize vehicle operating costs and maximize vehicle life by limiting the acceleration and speed. The limit threshold for the speed is set by the various inputs to the operating system 30. The operating system 30 may be configured to maximize energy regeneration and allows predictive vehicle system operation based on many different variables (e.g., topography of the route). For example, during a downhill drive the vehicle may slow down or coast while during an uphill drive the vehicle may accelerate based on the instructions given by operating system 30 by utilizing inputs provided to the operating system 30 (e.g. mapping/GPS and sensors). Ambient temperature may also be measured by the vehicle via an ambient temperature sensor (not shown). Since ambient temperature affects battery performance the operating system 30 may receive ambient temperature data from the ambient temperature sensor and provide commands to a battery management system (BMS) via controller 2. For example, high heat conditions may be optimal in order for the battery system 11a to output more power but may require additional cooling to avoid overheating. The operating system 30 may provide commands to the battery management system via controller 2 in order to increase cooling to the batteries. During low temperatures, the battery will likely operate with less power and the operating system 30 may provide commands to the battery system 11a via controller 2 to provide heating to the battery or provide commands to the generator system 11b to run in order to assist the batteries.

Other functions of the operating system may be to provide include optimization of HVAC, stereo systems, and other electronic systems in order to optimize operating efficiency of the vehicle.

Vehicle operating system 30 is preferably a cloud system that is external to the vehicle. However, in another embodiment vehicle operating system 30 may be included within vehicle 10. In another embodiment, vehicle 10, user devices 20, and applications 40 may aid the functions and operation of the vehicle operating system 30 as described herein (e.g. by providing processing power or task allocations). In another embodiment, operations and functions of vehicle operating system 30 may be provided by any combination of vehicle 10 and user devices 20. In some embodiments, vehicle operating system 30 is not required by the vehicle 10 to execute all functions. Vehicle 10 and/or devices 20 may provide the same operation and function of vehicle operating system 30 as described herein if operating system 30 is unavailable due to connectivity issues.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the vehicle network system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A vehicle system comprising:
   a vehicle including at least one vehicle sub-system comprising a powertrain system that includes a main propulsive battery and at least one propulsive motor, the main propulsive battery configured to power the at least one propulsive motor to rotate a wheel of the vehicle;
   a vehicle operating system located external of the vehicle, the vehicle operating system system-configured to communicate with the vehicle and determine a current range of the vehicle; and
   a user device configured to communicate user data with the vehicle operating system,
   wherein the vehicle operating system is further configured to:
      determine a recommended route for the vehicle based on the user data and the current range of the vehicle; and
      modify at least one parameter of the at least one vehicle sub-system based on the recommended route for the vehicle and the current range of the vehicle.

2. The vehicle system of claim 1, wherein the at least one vehicle sub-system comprises at least one of:
   a vehicle chassis system,
   an autonomous driver assistance system (ADAS); or
   a human-machine interface system (HMI).

3. The vehicle system of claim 1, further comprising one or more vehicle sensors configured to provide input signals to the vehicle operating system.

4. The vehicle system of claim_, wherein the vehicle operating system is further configured to:
   determine location data of the user device based on the user data; and
   predict a user intent based on the location data,
   wherein determining the recommended route for the vehicle is further based on the user intent.

5. The vehicle system of claim 1, wherein the recommended route for the vehicle includes a location of a charging station for the vehicle.

6. The vehicle system of claim 1, wherein:
   the at least one vehicle sub-system further includes a chassis sub-system comprising
   at least one of a vehicle suspension system or a vehicle drivetrain torque management system; and
   modifying the at least one parameter of the at least one vehicle sub-system comprises modifying at least one chassis-sub system parameter of the chassis sub-system.

7. The vehicle system of claim 1, wherein:
   the powertrain system further includes at least one of a battery system or a generator; and
   modifying the at least one parameter of the at least one vehicle sub-system comprises modifying at least one powertrain system parameter of the powertrain system.

8. The vehicle system of claim 7, wherein the modifying the at least one powertrain system parameter includes at least one of optimization of torque vectoring, selectively turning on or off regenerative braking, modifying throttle response, modifying engine mapping, or modifying brake response.

9. The vehicle of claim 6, wherein modifying the at least one chassis-sub system parameter of the chassis sub-system comprises modifying a stiffness of the vehicle suspension system.

10. The vehicle of claim 3, wherein modifying the at least one parameter of the at least one vehicle sub-system comprises modifying at least one ADAS sub-system parameter.

11. A method of operating a vehicle, the method comprising:
   controlling the vehicle via at least one vehicle sub-system comprising a powertrain system that includes a main propulsive battery powering at least one propulsive motor to rotate a wheel of the vehicle;

using a vehicle operating system located external of the vehicle:
    communicating with the vehicle;
    determining a current range of the vehicle; and
    receiving, from a user device, user data;
determining a recommended route for the vehicle based on the user data and the current range of the vehicle; and
modifying at least one parameter of the at least one vehicle sub-system output based on the recommended route for the vehicle and the current range of the vehicle.

12. The method of claim 11, wherein the at least one vehicle sub-system comprises at least one of:
    a vehicle chassis system;
    an autonomous driver assistance system (ADAS); or
    a human-machine interface system (HMI).

13. The method of claim 11, wherein the method further comprises receiving, from one or more vehicle sensors, input signals.

14. The method of claim 11, wherein, using the vehicle operating system, the method further comprises:
    determining location data of the user device based on the user data; and
    predicting a user intent based on the location data,
    wherein determining the recommended route for the vehicle is further based on the user intent.

15. The method of claim 11, wherein the recommended route for the vehicle includes a location of a charging station for the vehicle.

16. The method of claim 11, wherein
modifying the at least one parameter of the at least one vehicle sub-system comprises modifying at least one chassis-sub system parameter of at least one of a vehicle suspension system or a vehicle drivetrain torque management system.

17. The method of claim 11, wherein
modifying the at least one parameter of the at least one vehicle sub-system comprises modifying at least one powertrain sub-system parameter of at least one of a battery system or a generator based.

18. The method of claim 17, wherein modifying the at least one powertrain sub-system parameter comprises at least one of optimization of torque vectoring, selectively turning on or off regenerative braking, modifying throttle response, or modifying brake response.

19. The method of claim 16, wherein modifying the at least one chassis sub-system parameter comprises modifying a suspension stiffness.

20. The method of claim 12, wherein modifying the at least one parameter of the at least one vehicle sub-system comprises modifying at least one ADAS sub-system parameter.

* * * * *